US009335143B2

(12) United States Patent
Noda et al.

(10) Patent No.: US 9,335,143 B2
(45) Date of Patent: May 10, 2016

(54) FORM MEASURING APPARATUS AND METHOD OF REGISTERING COORDINATE SYSTEM FOR ROTARY TABLE

(71) Applicant: MITUTOYO CORPORATION, Kanagawa (JP)

(72) Inventors: Takashi Noda, Tochigi (JP); Hiroshi Kamitani, Tochigi (JP); Tomohiro Usui, Tochigi (JP)

(73) Assignee: MITUTOYO CORPORATION, Kanagawa (JP)

( * ) Notice: Subject to any disclaimer, the term of this patent is extended or adjusted under 35 U.S.C. 154(b) by 146 days.

(21) Appl. No.: 14/464,224

(22) Filed: Aug. 20, 2014

(65) Prior Publication Data

US 2015/0052770 A1 Feb. 26, 2015

(30) Foreign Application Priority Data

Aug. 23, 2013 (JP) ................. 2013-173051

(51) Int. Cl.
*G01B 5/012* (2006.01)
*G01C 25/00* (2006.01)
*G01B 21/04* (2006.01)
*G01B 5/008* (2006.01)

(52) U.S. Cl.
CPC .............. *G01B 5/012* (2013.01); *G01B 5/008* (2013.01); *G01B 21/042* (2013.01); *G01C 25/00* (2013.01)

(58) Field of Classification Search
CPC .......... G01B 5/012; G01B 5/20; G01B 5/008; G01C 25/00
USPC .................................. 33/503, 502
See application file for complete search history.

(56) References Cited

U.S. PATENT DOCUMENTS

| 4,080,741 | A | * | 3/1978 | Siddall | G01B 7/293 33/502 |
|---|---|---|---|---|---|
| 5,187,874 | A | * | 2/1993 | Takahashi | G01B 21/047 33/502 |
| 5,204,824 | A | | 4/1993 | Fujimaki | |
| 5,373,222 | A | * | 12/1994 | Hemmerle | G01B 11/26 318/572 |
| 6,092,411 | A | * | 7/2000 | Tokoi | G01B 5/008 33/546 |
| 6,225,771 | B1 | * | 5/2001 | Hammerle | G05B 19/401 318/568.22 |
| 6,886,264 | B2 | * | 5/2005 | Sakata | G01B 7/282 33/502 |
| 8,478,564 | B2 | | 7/2013 | Noda et al. | |
| 9,151,602 | B2 | * | 10/2015 | Noda | G01B 5/008 |

(Continued)

FOREIGN PATENT DOCUMENTS

JP H03-84408 A 4/1991
JP 2009-271030 A 11/2009

*Primary Examiner* — Christopher Fulton
(74) *Attorney, Agent, or Firm* — Greenblum & Bernstein, P.L.C.

(57) ABSTRACT

A form measuring apparatus includes a probe for measuring a measured object; a rotary table on which the measured object is placed; and a coordinate system calculator calculating coordinate axes configuring a coordinate system for the rotary table. The coordinate system calculator calculates, based on a position of a master ball fixated to the rotary table, a center of a circle traced by the master ball when the rotary table is rotated; calculates a rotary table coordinate system having the center of the circle as an origin point; and corrects coordinates of the origin point based on a calibrated diameter value of a gauge fixated to the rotary table, a first diameter value of the gauge measured by a first measurement in which the probe approaches the gauge in a first direction, and a second diameter value of the gauge measured by a second measurement.

9 Claims, 12 Drawing Sheets

(56) References Cited

U.S. PATENT DOCUMENTS

| | | | |
|---|---|---|---|
| 2009/0141131 A1* | 6/2009 | Arai | G01B 11/03 348/187 |
| 2013/0253871 A1* | 9/2013 | Gray | B23Q 17/22 702/95 |
| 2013/0310962 A1 | 11/2013 | Noda et al. | |
| 2014/0025336 A1 | 1/2014 | Noda et al. | |
| 2014/0130363 A1* | 5/2014 | Hagino | G01B 5/22 33/503 |
| 2015/0052768 A1* | 2/2015 | Wimmer | G01B 21/042 33/503 |
| 2015/0131697 A1* | 5/2015 | Sakai | G01B 21/045 374/56 |
| 2015/0377617 A1* | 12/2015 | Ould | G01B 21/04 702/168 |

* cited by examiner

FORM MEASURING APPARATUS AND METHOD OF REGISTERING COORDINATE SYSTEM FOR ROTARY TABLE

CROSS-REFERENCE TO RELATED APPLICATIONS

The present application claims priority under 35 U.S.C. §119 of Japanese Application No. 2013-173051, filed on Aug. 23, 2013, the disclosure of which is expressly incorporated by reference herein in its entirety.

BACKGROUND OF THE INVENTION

1. Field of the Invention

The present invention relates to a form measuring apparatus and a method of registering a rotary table coordinate system.

2. Description of Related Art

A coordinate measuring machine system that includes a rotary table is known. The following advantages, for example, are imparted by including the rotary table. First, measurement efficiency is improved because a plurality of surfaces of a measured object can be measured by a single stylus tip. Second, a measurement region can be enlarged. For example, when a rotary table is provided to a horizontal-type coordinate measuring machine (used as the coordinate measuring machine), the measurement region is approximately doubled. Third, simultaneous scanning measurement is enabled, performed by the three axes of the coordinate measuring machine and an additional fourth axis of a rotary table axis. For example, Japanese Patent Laid-open Publication No. H03-84408 discloses a method of maintaining a constant angular relationship between a work piece and a probe during scanning measurement in simultaneous scanning measurement in four axes.

In a case where the rotary table is used to perform measurement, a coordinate system for the rotary table must be registered before beginning. A master ball (standard ball) fixated to one end on a top surface of the rotary table is typically used to register the rotary table coordinate system. For example, the rotary table is rotated 0°, 120°, and 240° from a predetermined angle, and a center position of the master ball is measured at each rotation angle. The center of a circle passing through the three measured center positions and a normal line of a circular plane passing through the center of the circle are calculated. The center of the circle is registered as an origin point of the rotary table coordinate system and the normal line is registered as a Z axis of the rotary table coordinate system.

However, in a case where there is run-out in the rotation axis of the rotary table, when the above-described method of registering the rotary table coordinate system is used, when the diameter of a round cylindrical shaft is measured at a position far from the top surface of the rotary table and a position near the top surface of the rotary table, the shaft being arranged such that an axis direction thereof is perpendicular to the top surface of the rotary table, a measured value in the far position becomes larger than the measured value in the near position. Specifically, the above-described method of registering the rotary table coordinate system does not accommodate run-out of the rotation axis, and errors become significant.

Japanese Patent Laid-open Publication No. 2009-271030 discloses a method of registering a rotary table coordinate system capable of inhibiting errors due to run-out of a rotation axis. In this method, a Z axis of the rotary table coordinate system is calculated using two master balls at different distances from a top surface of a rotary table. Specifically, the rotary table is rotated 0°, 120°, and 240° from a predetermined angle, and a center position of a first master ball and a center position of a second master ball are measured at each rotation angle. The center of a first circle passing through the three measured center positions of the first master ball, the center of a second circle passing through the three measured center positions of the second master ball, and a straight line passing through the centers of the first and second circle are calculated. The center of the first circle is registered as an origin point of the rotary table coordinate system and the straight line is registered as the Z axis of the rotary table coordinate system.

As noted above, according to the method of registering the rotary table coordinate system according to Japanese Patent Laid-open Publication No. 2009-271030, by registering the straight line that passes through the centers of the first and second circles as the Z axis of the rotary table coordinate system, errors due to run-out of the rotation axis can be inhibited. However, the inventors of the present invention have discovered that in both of the above-described methods of registering rotary table coordinate systems, a degree of accuracy for a registered value of the origin point in the rotary table coordinate system can be improved.

SUMMARY OF THE INVENTION

Accordingly, the present disclosure provides a form measuring apparatus and a method of registering a rotary table coordinate system capable of improving a degree of accuracy for a registered value of an origin point in the rotary table coordinate system.

A form measuring apparatus according to the present disclosure includes a probe for measuring a measured object; a rotary table on which the measured object is placed and which is rotated relative to the probe; and a coordinate system calculator calculating coordinate axes configuring a coordinate system for the rotary table. The coordinate system calculator calculates, based on a position of a master ball fixated to the rotary table, a center of a circle traced by the master ball when the rotary table is rotated; calculates a coordinate system of the rotary table having the center of the circle as an origin point; and corrects coordinates of the origin point based on a calibrated diameter value of a gauge fixated to the rotary table, a first diameter value of the gauge measured by a first measurement in which the probe approaches the gauge in a first direction, and a second diameter value of the gauge measured by a second measurement in which the probe approaches the gauge in a second direction.

The probe is preferably driven so as to run parallel to each of an Xs axis, a Ys axis, and a Zs axis, which are mutually orthogonal. A rotation axis of the rotary table is preferably parallel to the Zs axis. The first direction is preferably parallel to the Xs axis, as viewed in the Zs axis direction. The second direction is preferably parallel to the Ys axis, as viewed in the Zs axis direction.

The form measuring apparatus preferably further includes a coordinate system register registering the coordinate system of the rotary table. The first measurement is preferably a static point measurement, in which the probe approaches the gauge in the first direction in a case where the rotary table has a plurality of different rotation angles. The second measurement is preferably a static point measurement, in which the probe approaches the gauge in the second direction in a case where the rotary table has a plurality of different rotation angles. The coordinate system calculator preferably calculates first corrected coordinates by correcting the coordinates of the origin point based on the calibrated diameter value, the first diameter value, and the second diameter value. The coordinate system calculator also preferably calculates second corrected coordinates by correcting the coordinates of the origin point based on the calibrated diameter value, a third diameter value of the gauge measured by rotary table scanning measurement in which the probe approaches the gauge in a third direction parallel to the first direction, and a fourth diameter value of the gauge measured by rotary table scanning measurement in which the probe approaches the gauge in a fourth direction parallel to the second direction. The coordinate system register registers the first corrected coordinates as the coordinates of the origin point in the coordinate system of the rotary table to be used in "clamp on" measurement, which measures a work piece fixated to the rotary table in a state where the rotary table is clamped so as to not rotate. The coordinate system register also registers the second corrected coordinates as the coordinates of the origin point in the coordinate system of the rotary table to be used in "clamp off" measurement, which measures the work piece fixated to the rotary table in a state where the rotary table is not clamped.

The coordinate system of the rotary table preferably includes a $Z_T$ axis corresponding to the rotation axis of the rotary table. The coordinate system calculator preferably calculates, based on a position of a second master ball fixated to the rotary table, the center of a second circle traced by the second master ball when the rotary table is rotated; and calculates the $Z_T$ axis based on the centers of the first and second circles. The distance from the rotary table to the first master ball is preferably different from the distance from the rotary table to the second master ball.

A method of registering a rotary table coordinate system according to the present disclosure includes measuring a position of a master ball fixated to a rotary table using a coordinate measuring machine in a case where the rotary table has a plurality of different rotation angles; calculating, based on the position of the master ball, a center of a circle traced by the master ball when the rotary table is rotated; calculating a coordinate system of the rotary table having the center of the circle as an origin point; measuring a first diameter value of a gauge fixated to the rotary table using a first measurement in which a probe of the coordinate measuring machine approaches the gauge in a first direction; measuring a second diameter value of the gauge using a second measurement in which the probe approaches the gauge in a second direction; and correcting coordinates of the origin point based on each of a calibrated diameter value, the first diameter value, and the second diameter value of the gauge.

The present disclosure provides a form measuring apparatus and a method of registering a rotary table coordinate system capable of improving a degree of accuracy for a registered value of an origin point in the rotary table coordinate system.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
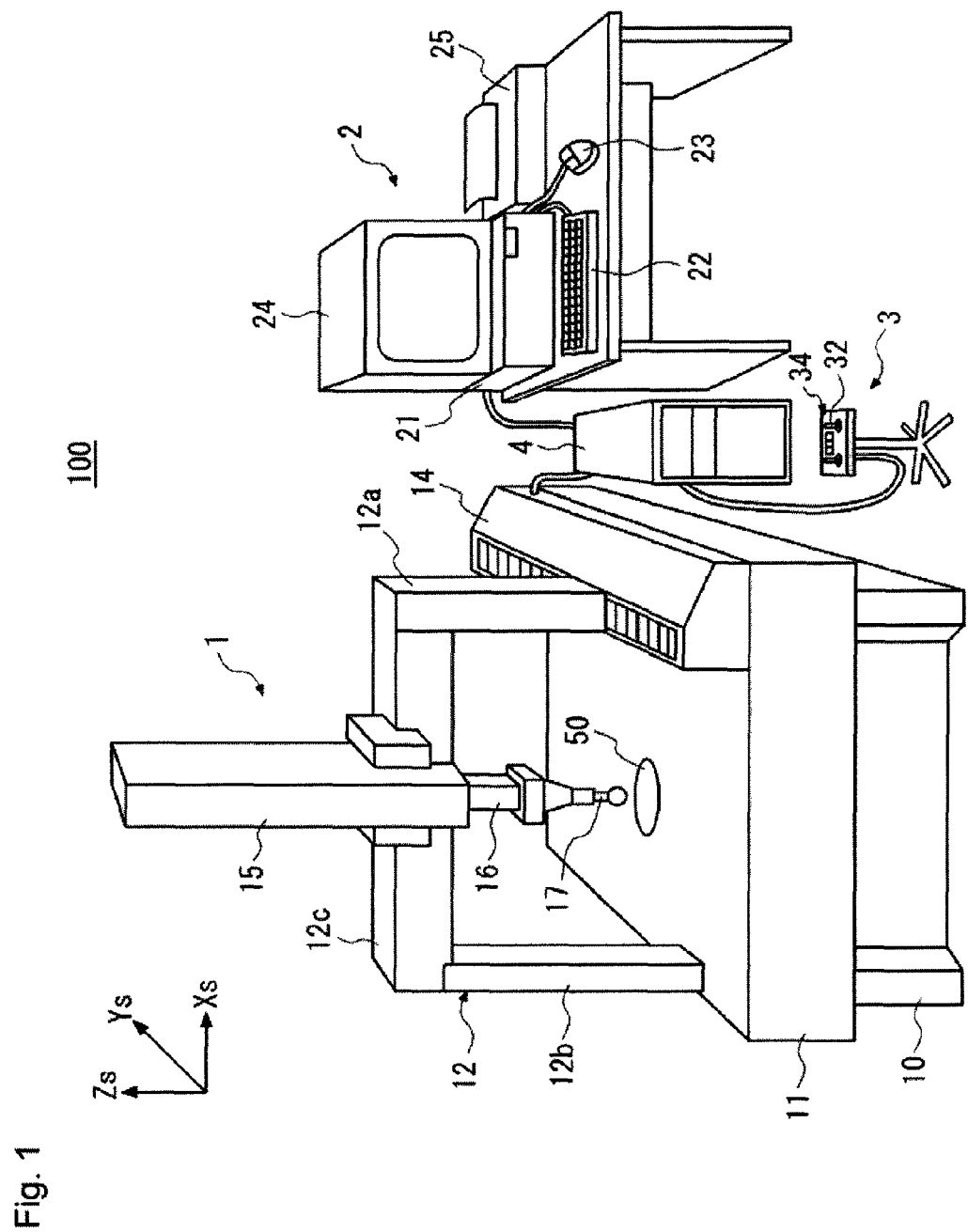
FIG. 1 is a perspective view schematically illustrating a a form measuring apparatus according to a first embodiment.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, an embodiment of the present disclosure is described with reference to the drawings. Identical reference numerals are assigned to identical elements in each of the plurality of drawings, and duplicative descriptions are omitted where necessary.

First Embodiment

FIG. 1 is a perspective view schematically illustrating a form measuring apparatus 100 according to a first embodiment. The form measuring apparatus 100 includes a coordinate measuring machine 1, a computer 2, a joystick box 3, a controller 4, and a rotary table 50. The coordinate measuring machine 1 may also be referred to as a three-dimensional coordinate measuring machine. The coordinate measuring machine 1 measures a work piece placed on the rotary table 50. The controller 4 executes drive control of the coordinate measuring machine 1 and the rotary table 50. The joystick box 3 is used to manually operate the coordinate measuring machine 1. The computer 2 is used to register a coordinate system, to save measurement data, to perform form analysis based on the measurement data, and the like.

A scale coordinate system is defined with respect to the coordinate measuring machine 1. The scale coordinate system includes an Xs axis, a Ys axis, and a Zs axis, which are mutually orthogonal. The Zs axis has a vertical, upward orientation. The coordinate measuring machine 1 includes an anti-vibration table 10, a base 11, a gantry type frame 12, a driving mechanism 14, a column 15, a spindle 16, and a probe 17. The base 11 is installed on top of the anti-vibration table 10 such that a top surface of the base 11 (a base surface) aligns with a horizontal plane. The driving mechanism 14, which extends parallel to the Ys axis, is installed on top of the base 11. The rotary table 50 is arranged in a recess formed in the base 11.

The gantry type frame 12 includes a beam 12c extending parallel to the Xs axis, and beam supports 12a and 12b supporting the beam 12c. The beam support 12a stands upright on top of the driving mechanism 14. The beam support 12b stands upright on top of the base 11. A bottom end of the beam support 12b is supported by an air bearing so as to be capable of displacement parallel to the Ys axis. The driving mechanism 14 drives the beam support 12a parallel to the Ys axis. Thereby, the gantry type frame 12 moves parallel to the Ys axis.

The beam 12c supports the column 15, which extends in a vertical direction (Zs axis direction). The column 15 is driven along the beam 12c, parallel to the Xs axis. The column 15 is provided such that the spindle 16 is driven along the column 15 parallel to the Zs axis. The contact-type probe 17 is mounted to a bottom end of the spindle 16. The probe 17 may also be referred to as a scanning probe. Using the probe 17, the coordinate measuring machine 1 measures the work piece placed on the rotary table 50. Details of the probe 17 will be described hereafter.

The computer 2 includes a computer main body 21, a keyboard 22, a mouse 23, a monitor 24, and a printer 25. Generic versions of the computer main body 21, keyboard 22, mouse 23, monitor 24, and printer 25 can be used, and so a detailed description of each is omitted.

The joystick box 3 includes a joystick 32 as an operator for manually operating movement of the probe 17, and a coordinate system selection switch 34 selecting a coordinate system when giving an instruction for a movement direction. Operating the coordinate system selection switch 34 enables switching between the scale coordinate system defined with respect to the coordinate measuring machine 1 and the rotary table coordinate system defined with respect to the rotary table 50. When the joystick 32 is operated, the probe 17 is driven according to the coordinate system selected by the coordinate system selection switch 34. Details of the controller 4 will be described hereafter.

Figure 2:
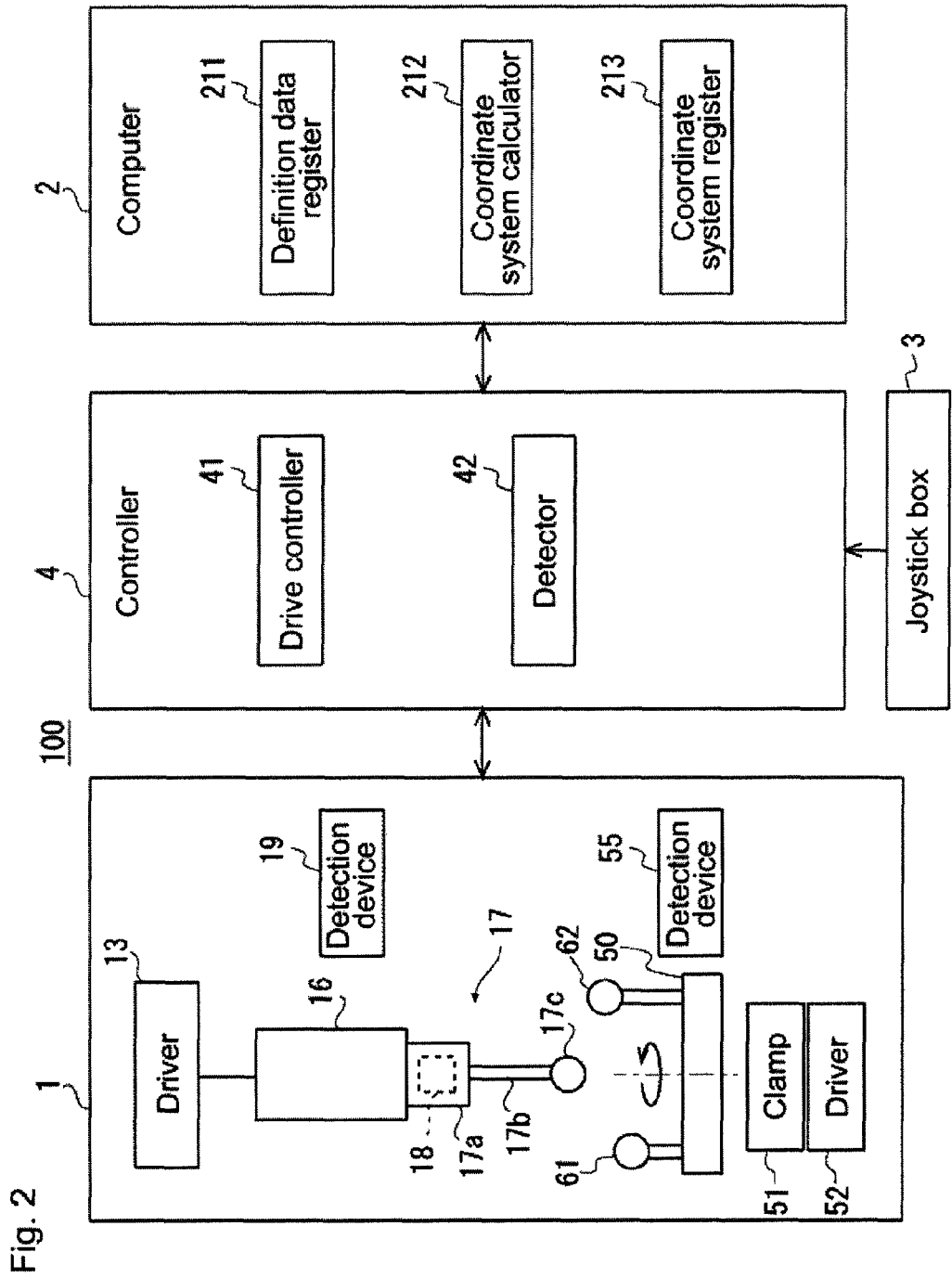
FIG. 2 is a block diagram schematically illustrating a configuration of the form measuring apparatus according to the first embodiment.

FIG. 2 is a block diagram schematically illustrating the configuration of the form measuring apparatus 100. The coordinate measuring machine 1 includes a driver 13, and detection devices 18 and 19. The driver 13 includes the driving mechanism 14 described above. The driver 13 drives the spindle 16 parallel to each of the Xs axis, the Ys axis, and the Zs axis based on a control signal from the controller 4. The detection device 19 detects displacement of the spindle 16 parallel to each of the Xs axis, the Ys axis, and the Zs axis, and outputs a detection result to the controller 4.

The probe 17 includes a probe main body 17a mounted to the spindle 16, a stylus 17b supported by the probe main body 17a, and a tip 17c provided to an end of the stylus 17b. The tip 17c is formed, for example, in a spherical shape, a round cylindrical shape, or a disk shape. The tip 17c may also be called a tip ball, a stylus head, or a contact piece. The probe main body 17a supports the stylus 17b such that the stylus 17b is capable of displacement in the three axis directions, and also biases the stylus 17b such that a position of a center of the tip 17c relative to the probe main body 17a returns to a reference position. Accordingly, the center of the tip 17c is positioned at the reference position in a state where the tip 17c does not contact the work piece, and the center of the tip 17c displaces from the reference position in a state where the tip 17c contacts the work piece. The detection device 18 detects the movement (deflection) of the center of the tip 17c from the reference position and outputs the detection result to the controller 4.

The form measuring apparatus 100 includes a clamp 51, a driver 52, and a detection device 55. The driver 52 rotates the rotary table 50 based on a control signal from the controller 4. A rotation axis of the rotary table 50 is parallel to the Zs axis, but may also be out of true parallel. The clamp 51 can assume a state where the rotary table 50 is clamped and a state where the rotary table 50 is not clamped based on a control signal from the controller 4. In the clamped state, the clamp 51 fixates the rotary table 50 by a mechanical mechanism and the rotary table 50 cannot rotate. In the non-clamped state, the rotary table 50 can rotate. The detection device 55 detects the rotation of the rotary table 50 and outputs the detection result to the controller 4. Master balls 61 and 62 can be fixated to the rotary table 50. In addition, the rotary table 50 includes a chuck (not shown in the drawings) for fixating the work piece.

The controller 4 includes a drive controller 41 and a detector 42. The drive controller 41 and the detector 42 may be provided as dedicated circuits, and may also be achieved by a CPU (Central Processing Unit, not shown in the drawings) executing a computer program stored in a storage device not shown in the drawings.

In a case where the coordinate measuring machine 1 is manually operated, the drive controller 41 generates a control signal based on output from the joystick box 3 and outputs a control signal to the driver 13, the clamp 51, and the driver 52. The drive controller 41 may also generate the control signal based on a command output by the computer 2 (computer main body 21) and output the control signal to the driver 13, the clamp 51, and the driver 52.

The detector 42 detects coordinates of the probe 17 as a probe coordinate vector S, based on the output of the detection device 19. The probe coordinate vector S indicates coordinates of the reference position of the probe 17 on the scale coordinate system. The detector 42 detects a deflection vector E of the probe 17 on the scale coordinate system, based on the output of the detection device 18. The deflection vector E may also be referred to as a push-in vector or a displacement vector. The detector 42 detects a rotation angle θ of the rotary table 50, based on the output of the detection device 55. The detector 42 outputs the probe coordinate vector S, the deflection vector E, and the rotation angle θ to the computer 2 (computer main body 21). In addition, the detector 42 feeds the probe coordinate vector S, the deflection vector E, and the rotation angle θ back to the drive controller 41.

The computer 2 (computer main body 21) generates a command and outputs the command to the controller 4, the command being generated based on, for example, an instruction from an operator input with an inputter such as the keyboard 22 and the mouse 23. The computer 2 (computer main body 21) includes a definition data register 211, a coordinate system calculator 212, and a coordinate system register 213. The definition data register 211, the coordinate system calculator 212, and the coordinate system register 213 may be provided as dedicated circuits, and may also be achieved by the CPU (not shown in the drawings) executing a computer program stored in the storage device not shown in the drawings.

The definition data register 211 registers definition data. The definition data includes, for example, a radius of the tip 17c, a radius of the master ball 61, a radius of the master ball 62, and a calibrated diameter value Dc of a ring gauge 65 described below. The definition data is defined by, for example, the inputter such as the keyboard 22 and the mouse 23. The coordinate system calculator 213 calculates and corrects the rotary table coordinate system, based on the output of the detector 42. The coordinate system register 213 registers coordinate system data such as the rotary table coordinate system. An outputter, such as the monitor 24 or the printer 25, outputs, for example, definition data, coordinate system data, measurement data, and form analysis results based on measurement data.

Figure 3:
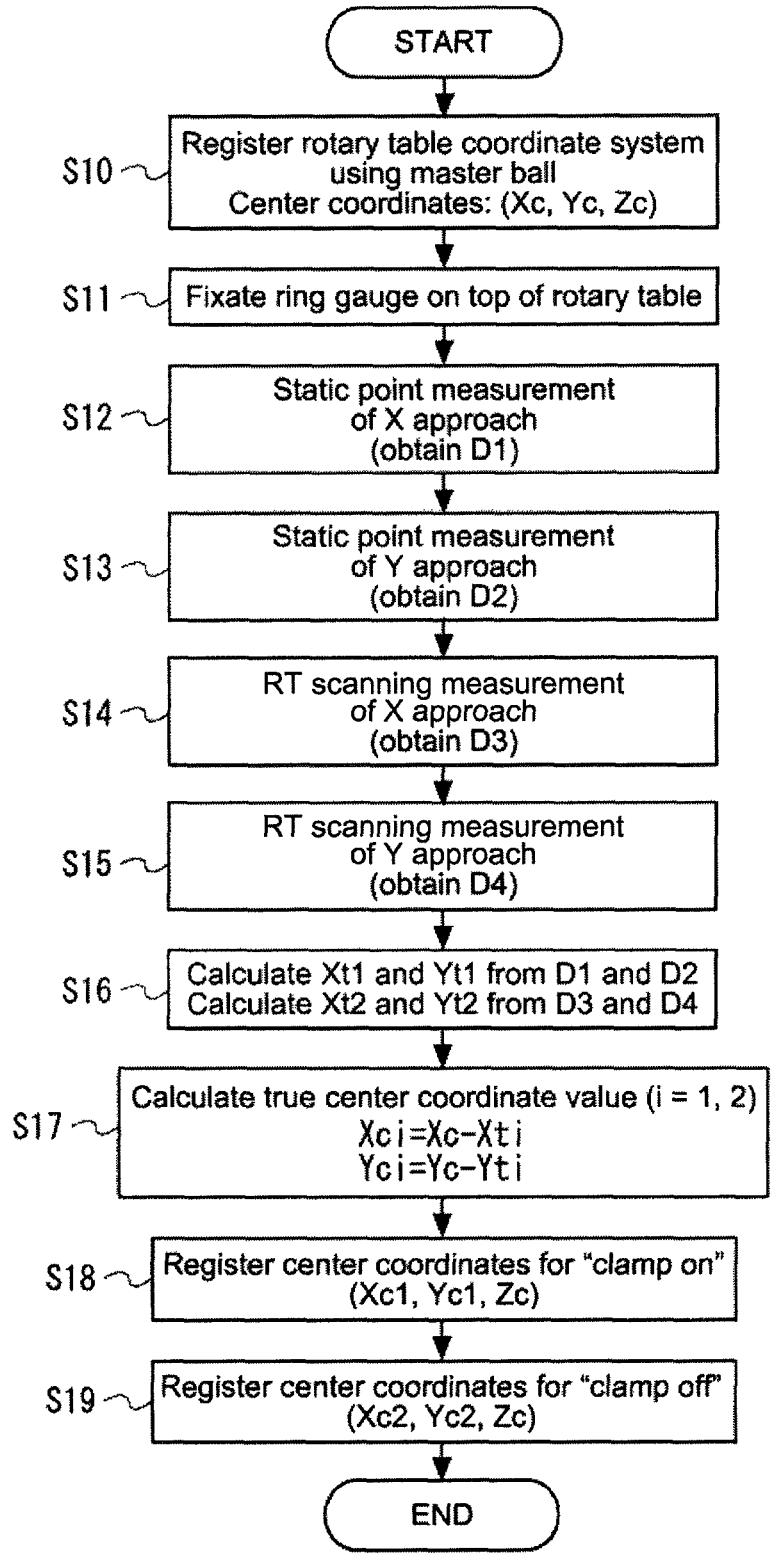
FIG. 3 is a flow chart illustrating a method of registering a rotary table coordinate system according to the first embodiment.

With reference to FIG. 3, a method of registering the rotary table coordinate system according to the first embodiment includes steps S10 to S19. Hereafter, the method of registering the rotary table coordinate system is described.

(Step S10)

Initially, the coordinate system of the rotary table 50 is registered using the master balls 61 and 62. The rotary table coordinate system includes the center coordinates (Xc, Yc, Zc) of the rotary table 50. The center coordinates (Xc, Yc, Zc) are the coordinates of the origin point of the rotary table coordinate system. Hereafter, a method of registering the rotary table coordinate system using the master balls 61 and 62 is described in detail.

The master balls 61 and 62 are fixated to top surface ends of the rotary table 50. A distance from the rotary table 50 to the master ball 62 is longer than a distance from the rotary table 50 to the master ball 61. The master balls 61 and 62 are, for example, fixated at positions 180° opposite each other with a rotation axis of the rotary table 50 therebetween. In a case where there are a plurality (three or more) of different rotation angles θ of the rotary table 50, the form measuring apparatus 100 measures the positions of the master balls 61 and 62, respectively, using the probe 17.

Figure 4:
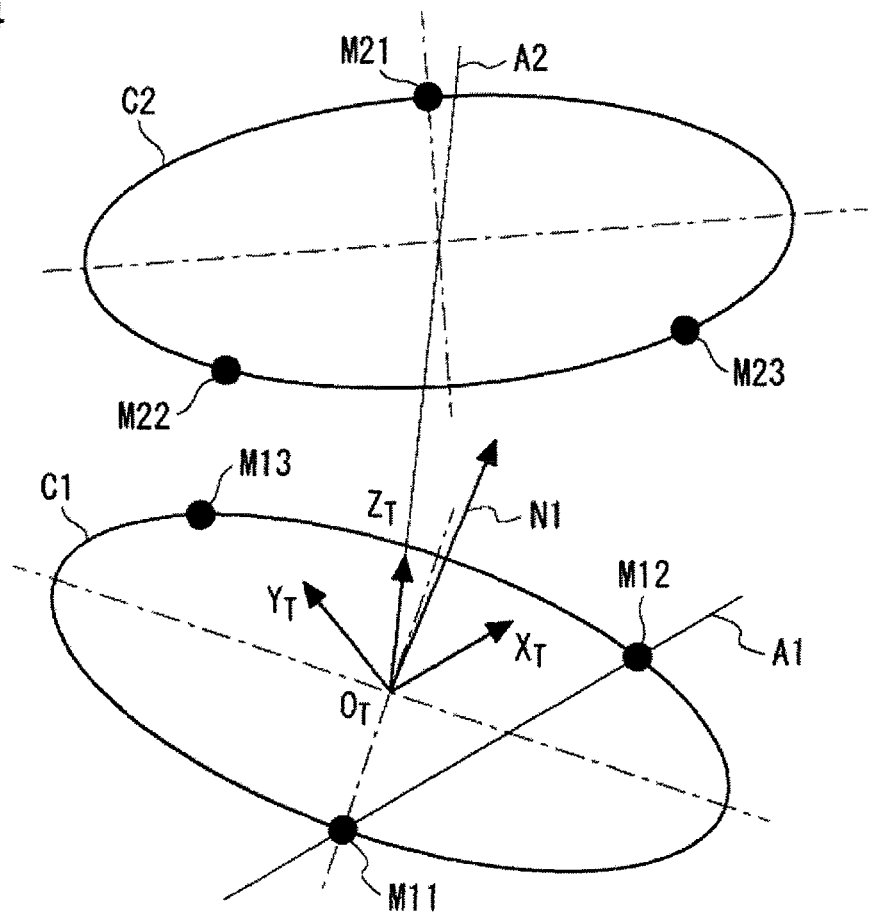
FIG. 4 is a schematic view illustrating a method of registering the rotary table coordinate system using master balls.

With reference to FIG. 4, through the above-noted measurement, measurement is made of each of center positions M11, M12, and M13 of the master ball 61 in a case where the rotation angle θ is α+0°, α+120°, and α+240°, respectively, while measurement is made of each of center positions M21, M22, and M23 of the master ball 62 in a case where the rotation angle θ is α+0°, α+120°, and α+240°, respectively. Herein, α is an arbitrary angle. Measurement of the center positions M11, M12, and M13 and measurement of the center positions M21, M22, and M23 are executed in a state where the clamp 51 has clamped the rotary table 50. The coordinate system calculator 212 calculates the rotary table coordinate system based on the center positions M11, M12, M13, M21, M22, and M23. The rotary table coordinate system includes an origin point $O_T$, an $X_T$ axis, a $Y_T$ axis, and a $Z_T$ axis shown in FIG. 4.

Moreover, the center position of the tip 17c is calculated based on the probe coordinate vector S and the deflection vector E. A position of a point of contact between the tip 17c and a measured object is calculated based on the center position of the tip 17c, the direction of the deflection vector E, and the radius of the tip 17c. The radii of the master balls 61 and 62 are known, and so the center position of each of the master balls 61 and 62 can be calculated using the position of the point of contact between the tip 17c and the master balls 61 and 62.

Based on the center positions M11, M12, and M13, the coordinate system calculator 212 calculates the center of a circle C1 traced by the master ball 61 when the rotary table 50 rotates and, based on the center positions M21, M22, and M23, calculates the center of a circle C2 traced by the master ball 62 when the rotary table 50 rotates. The coordinate system calculator 212 defines the center of the circle C1 as the origin point $O_T$. The coordinates of the origin point $O_T$ are the center coordinates (Xc, Yc, Zc). The coordinate system calculator 212 calculates the $X_T$ axis such that the $X_T$ axis is parallel to a straight line A1 passing through the center position M11 and the center position M12; calculates the $Z_T$ axis such that the $Z_T$ axis is arranged on a straight line A2 passing through the center of the circle C1 and the center of the circle C2; and calculates the $Y_T$ axis such that the $Y_T$ axis is perpendicular to the $X_T$ axis and the $Z_T$ axis. The $Z_T$ axis corresponds to the rotation axis of the rotary table 50.

Figure 5:
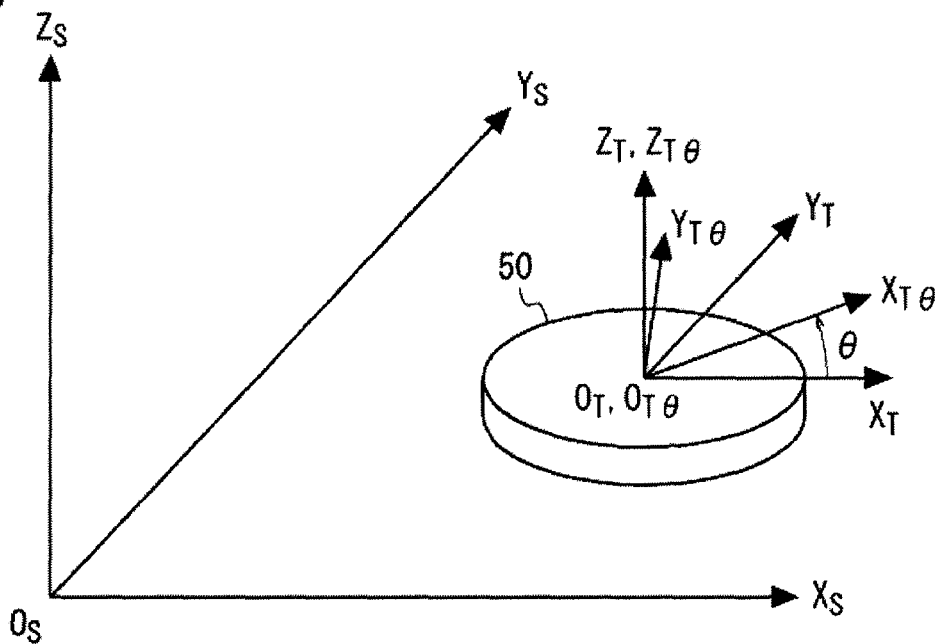
FIG. 5 is a schematic view illustrating a relationship between coordinate systems.

With reference to FIG. 5, a description is given of a relationship between the scale coordinate system (origin point Os, Xs axis, Ys axis, Zs axis); a rotary table fixated coordinate system (origin point $O_T$, $X_T$ axis, $Y_T$ axis, $Z_T$ axis), which is constant relative to the rotation of the rotary table 50; and a rotary table rotating coordinate system (origin point $O_{T\theta}$, $X_{T\theta}$ axis, $Y_{T\theta}$ axis, and $Z_{T\theta}$ axis), which rotates together with the rotary table 50. The $Z_T$ axis is preferably parallel to the Zs axis, but may also be out of true parallel. Directions of the $X_T$ axis and the $Y_T$ axis differ according to the value of a, but in the following description, as viewed in the Zs axis direction, the $X_T$ axis direction matches the Xs axis direction and the $Y_T$ axis direction matches the Ys axis direction. The origin point $O_{T\theta}$ and the $Z_{T\theta}$ axis match the origin point $O_T$ and the $Z_T$ axis, respectively. The $X_{T\theta}$ axis and the $Y_{T\theta}$ axis rotate around the $Z_{T\theta}$ axis ($Z_T$ axis) when the rotary table 50 rotates and match the $X_T$ axis and the $Y_T$ axis, respectively, when the rotation angle θ is 0°. The coordinate system calculator 212 calculates the $X_{T\theta}$ axis and the $Y_{T\theta}$ axis based on the rotary table fixated coordinate system and the rotation angle θ. The coordinate system calculator 212 may calculate the rotary table rotating coordinate system each time the rotation angle θ is detected, or may calculate the rotary table rotating coordinate system ahead of time for all values of the rotation angle θ. The coordinate system register 213 registers the rotary table fixated coordinate system. The coordinate system register 213 may also register the rotary table rotating coordinate system for which all values of the rotation angle θ have been calculated.

In step S10, the probe 17 is greatly moved in order to measure the master balls 61 and 62. Therefore, a degree of measurement accuracy of the coordinate measuring machine 1 can be understood to influence the accuracy of the center coordinates (Xc, Yc, Zc). In a case where the center coordinates (Xc, Yc, Zc) deviate from a true center of rotation of the rotary table 50, a measured value will vary when measuring the diameter value of the work piece with circle measurement that uses the rotary table 50. Accordingly, the center coordinates (Xc, Yc, Zc) are corrected in the following steps.

(Step S11)

Figure 6:
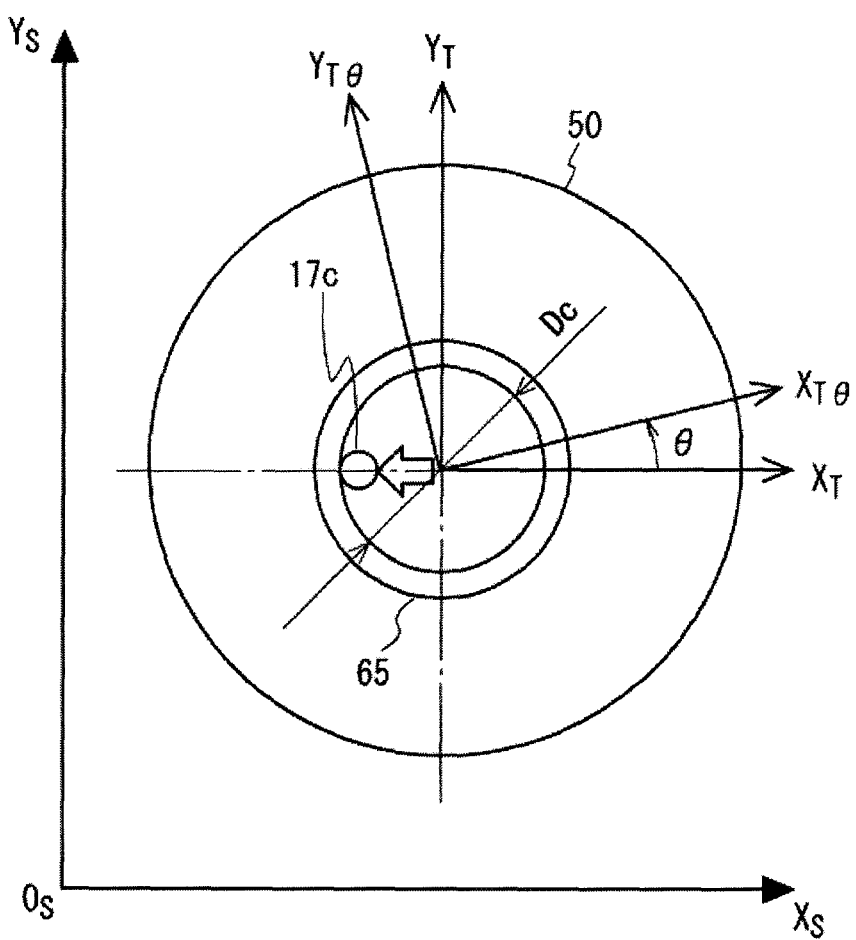
FIG. 6 is a schematic view describing a method of measuring a diameter value of a ring gauge using static point measurement of an X approach.

With reference to FIG. 6, the ring gauge 65 having the calibrated diameter value Dc is fixated to the rotary table 50. In FIG. 6, the center of the ring gauge 65 and the center of the rotary table 50 are matched. However, this is not necessarily required.

(Step S12)

With reference to FIG. 6, the form measuring apparatus 100 measures a diameter value D1 of the ring gauge 65 using static point measurement of an X approach. For example, in a case where the rotary table 50 has a plurality of different rotation angles θ, coordinates in the rotary table rotating coordinate system ($X_{T\theta}$ coordinate and $Y_{T\theta}$ coordinate) are measured for an approach point where the probe 17 approaches the ring gauge 65 in a $-X_T$ axis direction. Herein, the tip 17c of the probe 17 passes through the center of the ring gauge 65 and approaches on a straight line parallel to the $X_T$ axis. Accordingly, in the case with the plurality of different rotation angles θ, the approach direction is a shared direction. The approach point is the point of contact between the tip 17c and the ring gauge 65. Measurement of the approach point coordinates is executed in a state where the clamp 51 is clamping the rotary table 50 and the tip 17c is not moved relative to the ring gauge 65. In the case with the plurality of different rotation angles θ, the coordinate system calculator 212 calculates the diameter value D1 of the ring gauge 65 based on the approach point coordinates measured for each. Herein, the case with the plurality of different rotation angles θ is, for example, a case with eight rotation angles θ (0°, 45°, 90°, 135°, 180°, 225°, 270°, 315°, and 360°).

(Step S13)

Figure 7:
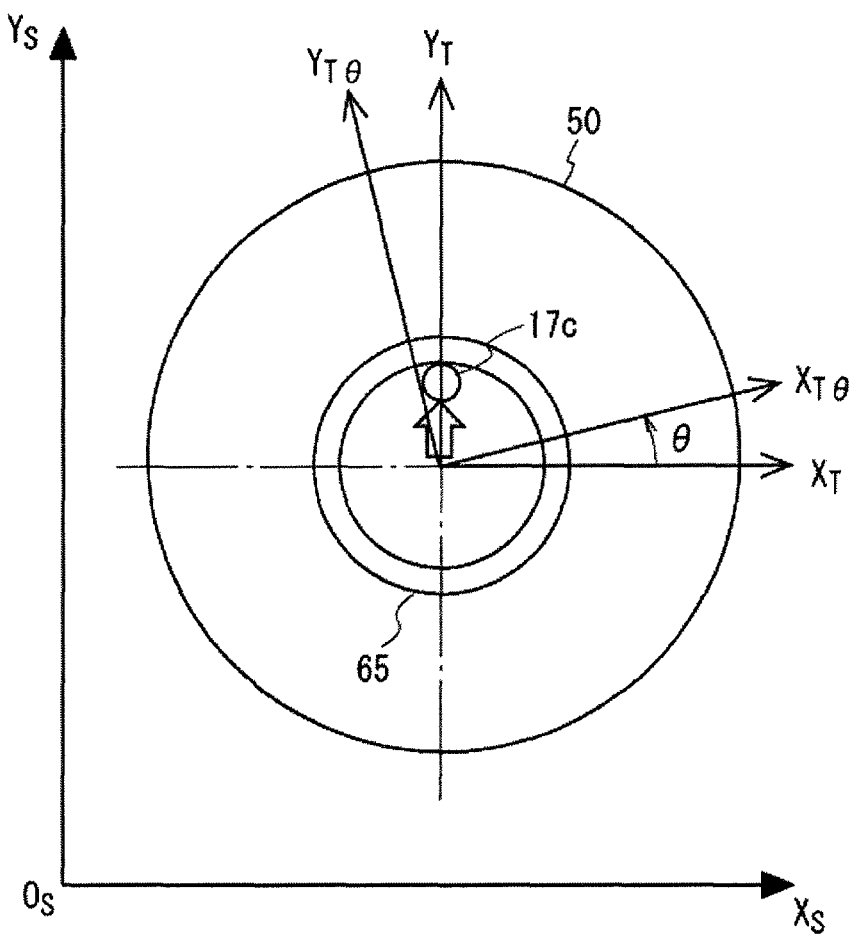
FIG. 7 is a schematic view describing a method of measuring a diameter value of a ring gauge using static point measurement of a Y approach.

With reference to FIG. 7, the form measuring apparatus 100 measures a diameter value D2 of the ring gauge 65 using static point measurement of a Y approach. For example, in a case where the rotary table 50 has a plurality of different rotation angles θ, coordinates in the rotary table rotating coordinate system ($X_{T\theta}$ coordinate and $Y_{T\theta}$ coordinate) are measured for an approach point where the probe 17 approaches the ring gauge 65 in the $Y_T$ axis direction. Herein, the moved 17c of the probe 17 passes through the center of the ring gauge 65 and approaches on a straight line parallel to the $Y_T$ axis. Accordingly, in the case with the plurality of different rotation angles θ, the approach direction is a shared direction. The approach point is the point of contact between the tip 17c and the ring gauge 65. Measurement of the approach point coordinates is executed in a state where the clamp 51 is clamping the rotary table 50 and the tip 17c is not moved relative to the ring gauge 65. In the case with the plurality of different rotation angles θ, the coordinate system calculator 212 calculates the diameter value D2 of the ring gauge 65 based on the approach point coordinates measured for each. Herein, the case with the plurality of different rotation angles θ is, for example, a case with eight rotation angles θ (0°, 45°, 90°, 135°, 180°, 225°, 270°, 315°, and 360°).

(Step S14)

Figure 8:
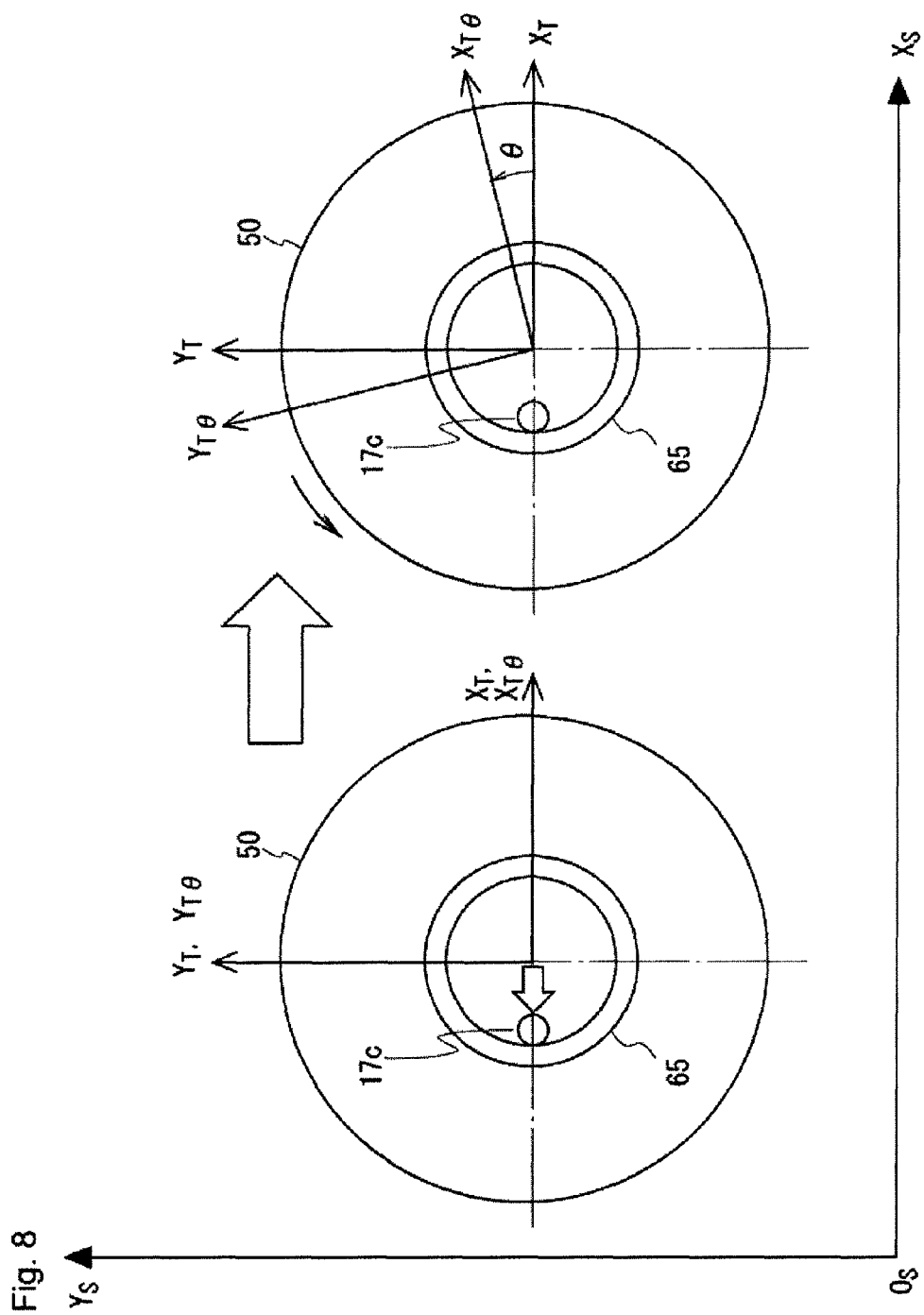
FIG. 8 is a schematic view describing a method of measuring a diameter value of a ring gauge using rotary table scanning measurement of the X approach.

With reference to FIG. 8, the form measuring apparatus 100 measures a diameter value D3 of the ring gauge 65 using rotary table scanning measurement of the X approach. The rotary table scanning measurement may also be referred to as RT scanning measurement. For example, in a state where the rotation angle θ of the rotary table 50 is fixed at 0°, the form measuring apparatus 100 performs circle measurement of the ring gauge 65 to measure the center of the ring gauge 65. The circle measurement may be either one of point measurement and scan measurement. For example, in the state where the rotation angle θ of the rotary table 50 is fixed at 0°, the form measuring apparatus 100 causes the probe 17 to approach the ring gauge 65 in the $-X_T$ axis direction. Herein, the tip 17c of the probe 17 passes through the center of the ring gauge 65 and approaches on a straight line parallel to the $X_T$ axis. The form measuring apparatus 100 executes the rotary table scanning measurement, in which the rotary table 50 rotates, and obtains, at a predetermined measurement pitch, coordinates in the rotary table rotating coordinate system ($X_{T\theta}$ coordinate and $Y_{T\theta}$ coordinate) for the point of contact between the tip 17c and the ring gauge 65. In the rotary table scanning measurement, the probe 17 is driven such that the tip 17c is retained in a state of contact with the ring gauge 65, and such that a direction of a vector oriented from the center of the ring gauge 65 toward the tip 17c is retained in a state matching the approach direction ($-X_T$ axis direction). The coordinates for the point of contact between the tip 17c and the ring gauge 65 are obtained in a state where the clamp 51 does not clamp the rotary table 50 and the tip 17c is displaced relative to the ring gauge 65. The coordinate system calculator 212 calculates the diameter value D3 of the ring gauge 65 based on the coordinates of the point of contact between the tip 17c and the ring gauge 65.

(Step S15)

Figure 9:
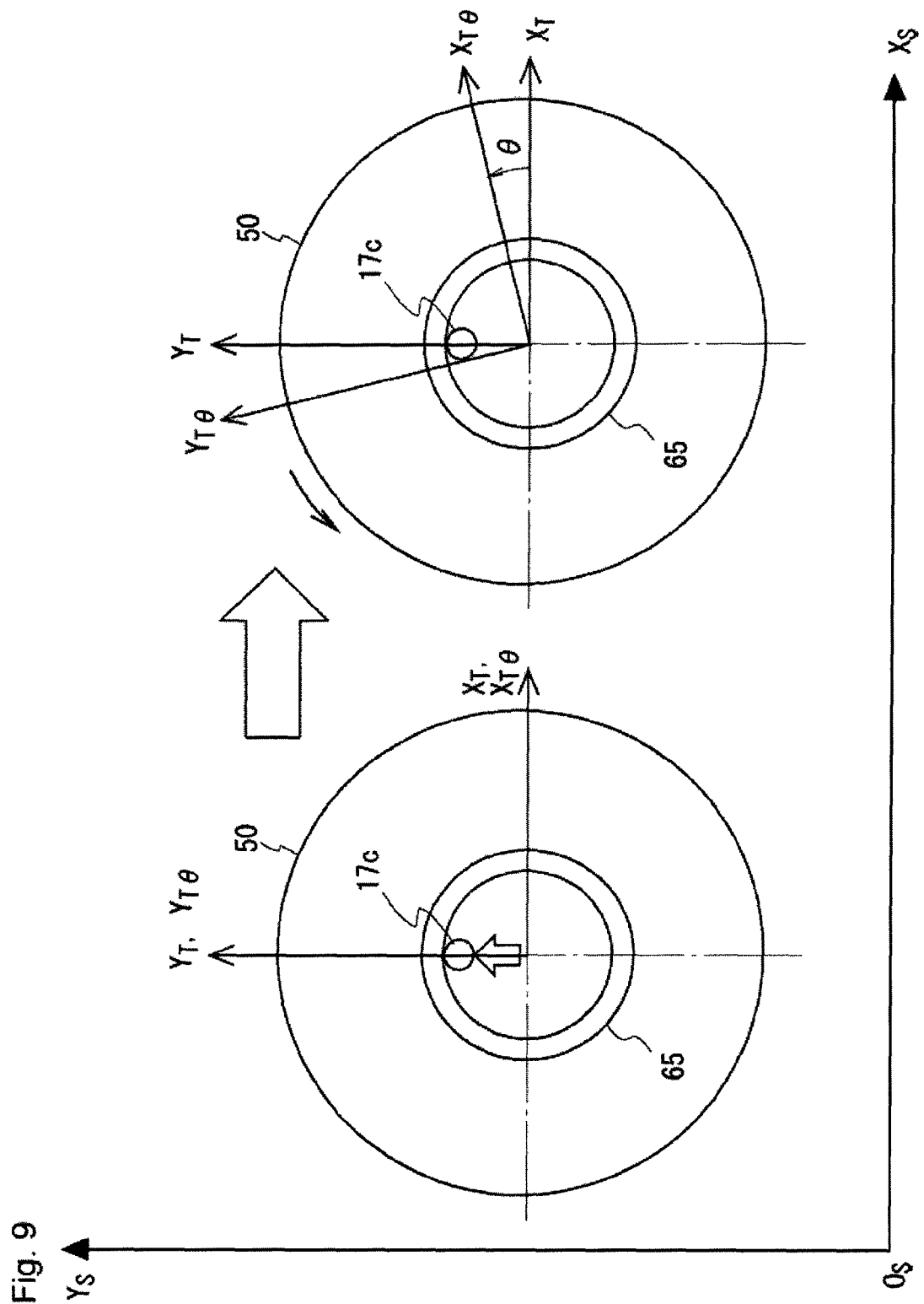
FIG. 9 is a schematic view describing a method of measuring a diameter value of a ring gauge using rotary table scanning measurement of the Y approach.

With reference to FIG. 9, the form measuring apparatus 100 measures a diameter value D4 of the ring gauge 65 using rotary table scanning measurement of the Y approach. For example, in the state where the rotation angle θ of the rotary table 50 is fixed at 0°, the form measuring apparatus 100 performs circle measurement of the ring gauge 65 to measure the center of the ring gauge 65. The circle measurement may be either one of point measurement and scan measurement. In the state where the rotation angle θ of the rotary table 50 is fixed at 0°, the form measuring apparatus 100 causes the probe 17 to approach the ring gauge 65 in the $Y_T$ axis direction. Herein, the tip 17c of the probe 17 passes through the center of the ring gauge 65 and approaches on a straight line parallel to the $Y_T$ axis. The form measuring apparatus 100 executes the rotary table scanning measurement, in which the rotary table 50 rotates, and obtains, at a predetermined measurement pitch, coordinates in the rotary table rotating coordinate system ($X_{T\theta}$ coordinate and $Y_{T\theta}$ coordinate) for the point of contact between the tip 17c and the ring gauge 65. In the rotary table scanning measurement, the probe 17 is driven such that the tip 17c is retained in a state of contact with the ring gauge 65, and such that a direction of a vector oriented from the center of the ring gauge 65 toward the tip 17c is retained in a state matching the approach direction ($Y_T$ axis direction). The coordinates for the point of contact between the tip 17c and the ring gauge 65 are obtained in a state where the clamp 51 does not clamp the rotary table 50 and the tip 17c is displaced relative to the ring gauge 65. The coordinate system calculator 212 calculates the diameter value D4 of the ring gauge 65 based on the coordinates of the point of contact between the tip 17c and the ring gauge 65.

In the measurements of steps S12 through S15, the rotary table 50 rotates. However, an amount of movement of the probe 17 in the steps S12 through S15 is small in comparison to the amount of movement when measuring the master balls 61 and 62 in step S10. Therefore, the diameter value of the ring gauge 65 can be measured with a high degree of accuracy.

(Step S16)

The coordinate system calculator 212 calculates Xt1 and Yt1 based on the diameter values Dc, D1, and D2. Xt1 is represented by the following formula.

[Formula 1]

$$Xt1 = \frac{-(Dc + 2M1) + \sqrt{2D1^2 - Dc^2 + 4DcM1 - 4M1^2}}{4} \quad (1)$$

Yt1 is represented by the following formula.

[Formula 2]

$$Yt1 = Xt1 + M1 \quad (2)$$

M1 is represented by the following formula.

[Formula 3]
$$M1 = \frac{D2^2 - D1^2}{4Dc} \quad (3)$$

The coordinate system calculator 212 calculates Xt2 and Yt2 based on the diameter values Dc, D3, and D4. Xt2 is represented by the following formula.

[Formula 4]
$$Xt2 = \frac{-(Dc+2M2) + \sqrt{2D3^2 - Dc^2 + 4DcM2 - 4M2^2}}{4} \quad (4)$$

Yt2 is represented by the following formula.

[Formula 5]
$$Yt2 = Xt2 + M2 \quad (5)$$

M2 is represented by the following formula.

[Formula 6]
$$M2 = \frac{D4^2 - D3^2}{4Dc} \quad (6)$$

(Step S17)

As shown in the formula below, the coordinate system calculator 212 calculates true coordinate values Xc1 and Xc2 by correcting the coordinate value Xc in the coordinates of the origin point $O_T$ (center coordinates) of the rotary table coordinate system, using Xt1 and Xt2 respectively.

[Formula 7]
$$Xci = Xc - Xti\ (i=1,2) \quad (7)$$

As shown in the formula below, the coordinate system calculator 212 calculates true coordinate values Yc1 and Yc2 by correcting the coordinate value Yc in the coordinates of the origin point $O_T$ (center coordinates) of the rotary table coordinate system, using Yt1 and Yt2 respectively.

[Formula 8]
$$Yci = Yc - Yti\ (i=1,2) \quad (8)$$

(Step S18)

The coordinate system register 213 registers corrected coordinates (Xc1, Yc1, Zc) as the coordinates of the rotary table coordinate system origin point $O_T$ ($O_{T\theta}$), to be used in "clamp on" measurement measuring the work piece fixated to the rotary table 50 in a state where the rotary table 50 is clamped.

(Step S19)

The coordinate system register 213 registers corrected coordinates (Xc2, Yc2, Zc) as the coordinates of the rotary table coordinate system origin point $O_T$ ($P_{T\theta}$), to be used in "clamp off" measurement measuring the work piece fixated to the rotary table 50 in a state where the rotary table 50 is not clamped.

Hereafter, with reference to FIGS. 10 to 13, a description is given of principles of a correction process for the center coordinates in the rotary table coordinate system. In the following, the principles of the correction process are described for a case of rotary table scanning measurement. However, the principles of the correction process are similar for a case of static point measurement, as well.

Figure 10:
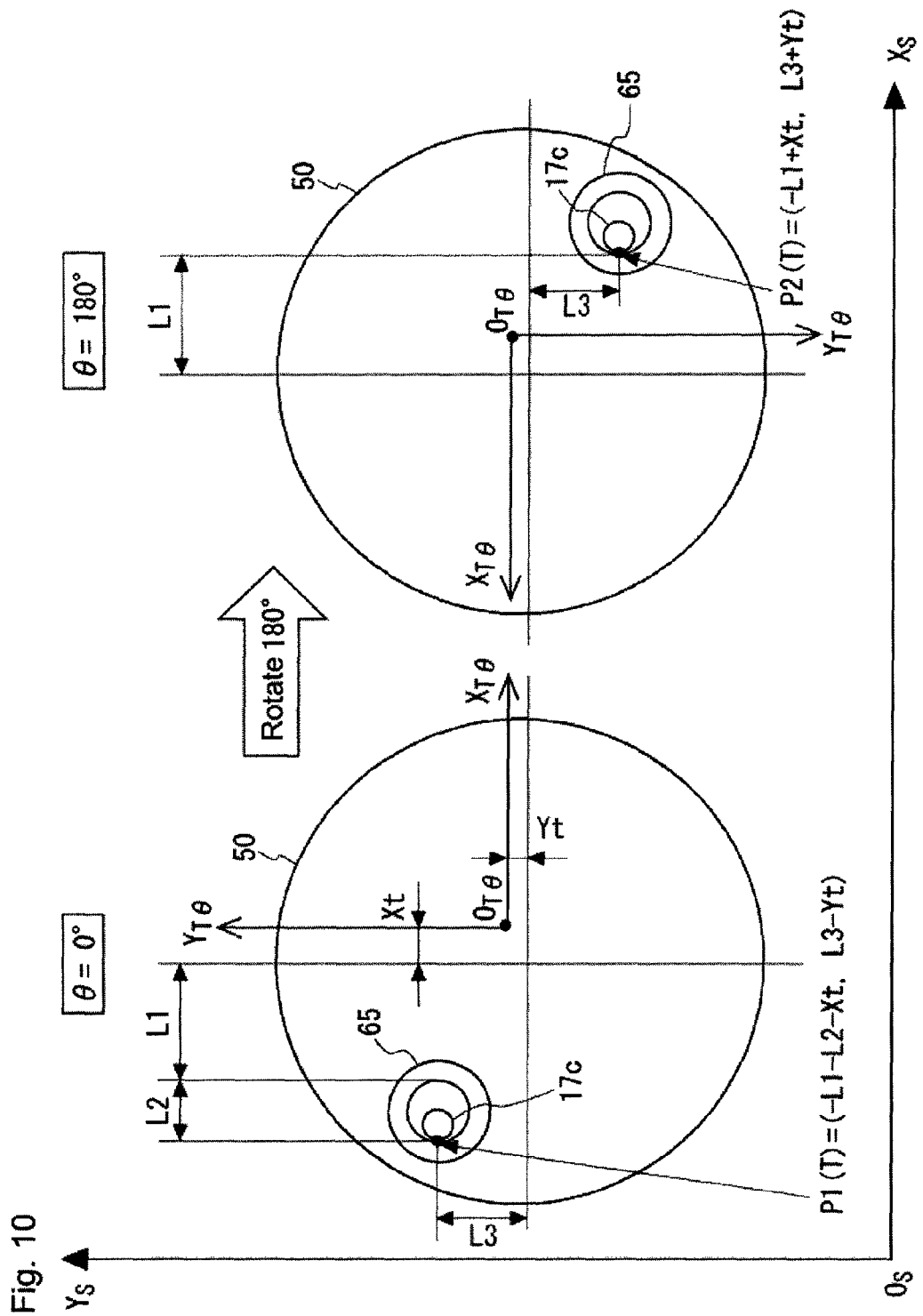
FIG. 10 is a schematic view describing principles of a correction process for a center coordinate of the rotary table coordinate system.

With reference to FIG. 10, deviation between a true center of rotation of the rotary table 50 and the origin point $O_T$ ($O_{T\theta}$) calculated in step S10 is designated as (Xt, Yt). For simplicity, Xt and Yt are both positive in FIG. 10. A rotary table rotating coordinate system coordinate P1(T) for a point of contact P1 between the tip 17c and the ring gauge 65 is represented by the following formula, the tip 17c and the ring gauge 65 making contact when the probe 17 approaches in the $-X_T$ axis direction in a state where the rotation angle θ is 0°.

[Formula 9]
$$P1(T) = (-L1 - L2 - Xt, L3 - Yt) \quad (9)$$

Here, L1 is a distance from a straight line to an inner diameter end of the ring gauge 65, the straight line passing through the true center of rotation of the rotary table 50 and running parallel to the $Y_{T\theta}$ axis. L2 is equal to the calibrated diameter value Dc of the ring gauge 65. L3 is a distance from a straight line to the point of contact P1, the straight line passing through the true center of rotation of the rotary table 50 and running parallel to the $X_{T\theta}$ axis.

Similarly, a rotary table rotating coordinate system coordinate P2(T) for a point of contact P2 between the tip 17c and the ring gauge 65 is represented by the following formula, the tip 17c and the ring gauge 65 making contact when the rotation angle θ is 180°.

[Formula 10]
$$P2(-L1 + Xt, L3 + Yt) \quad (10)$$

A distance between the coordinates P1(T) and P2(T) is equal to the diameter value D3 measured in step S14, and thus yields the following formula.

[Formula 11]
$$(Dc + 2Xt)^2 + (2Yt)^2 = D3^2 \quad (11)$$

Figure 11:
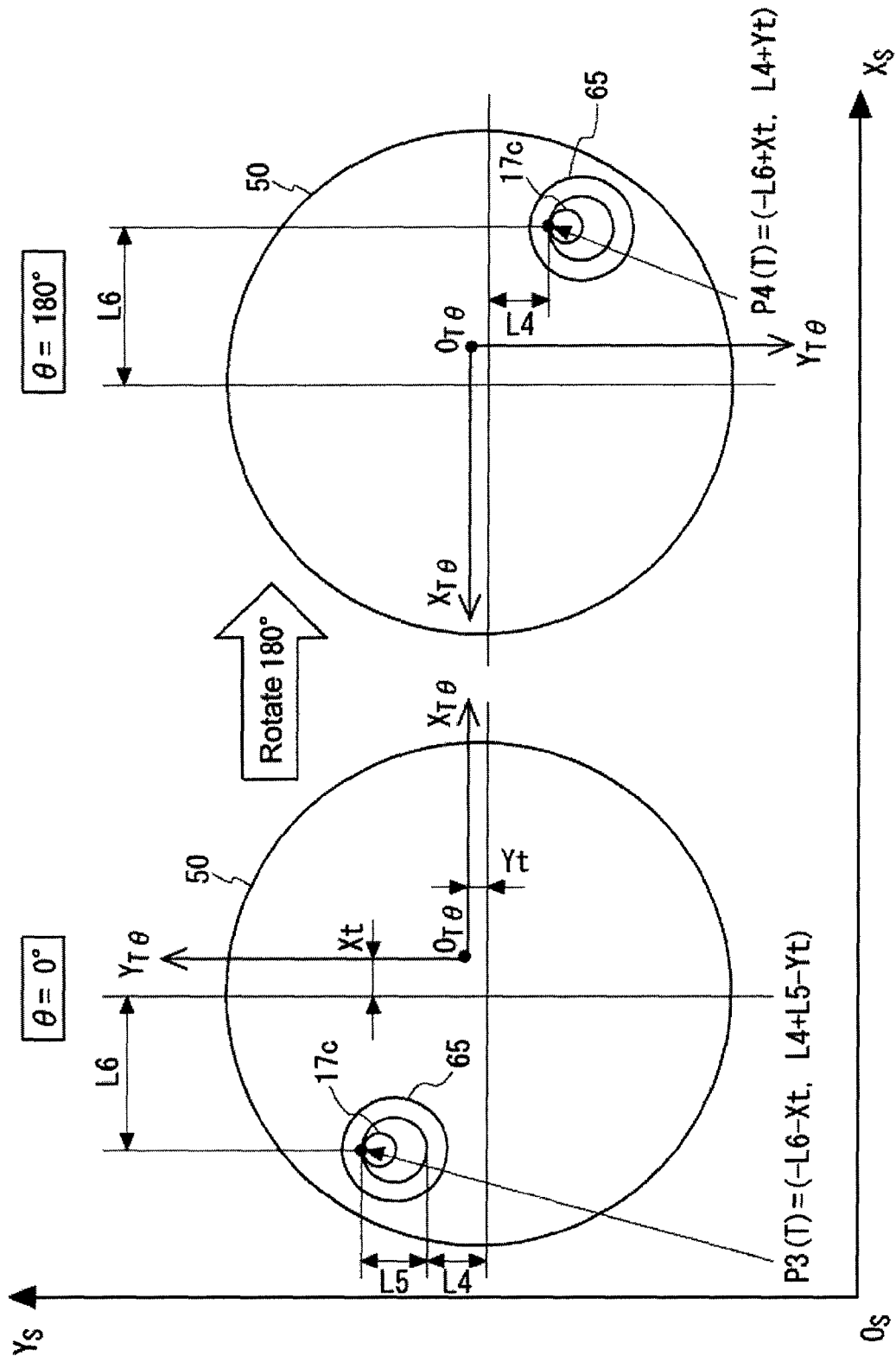
FIG. 11 is a schematic view describing principles of the correction process for the center coordinate of the rotary table coordinate system.
Figure 12:
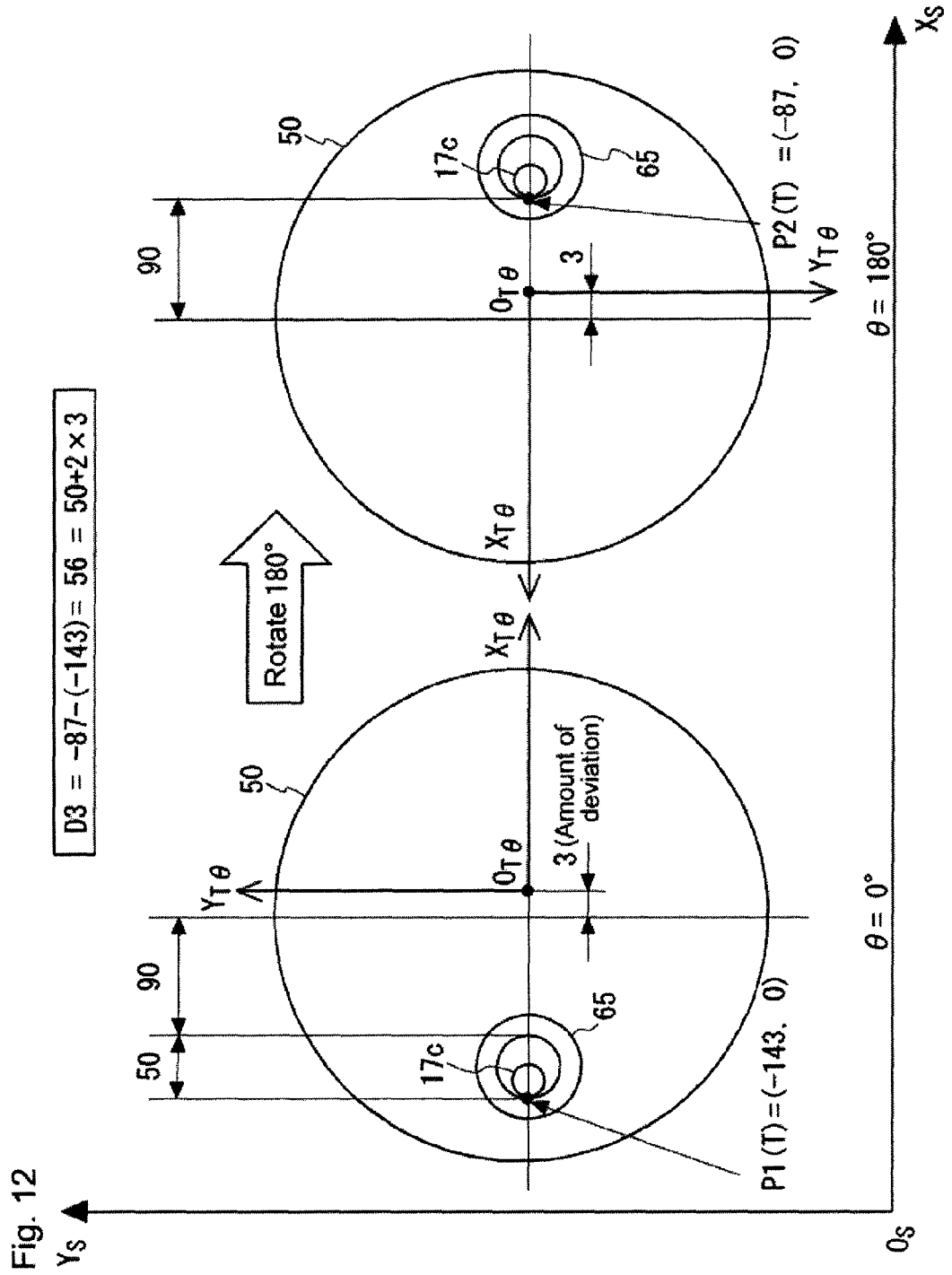
FIG. 12 is a schematic view describing principles of the correction process for the center coordinate of the rotary table coordinate system.
Figure 13:
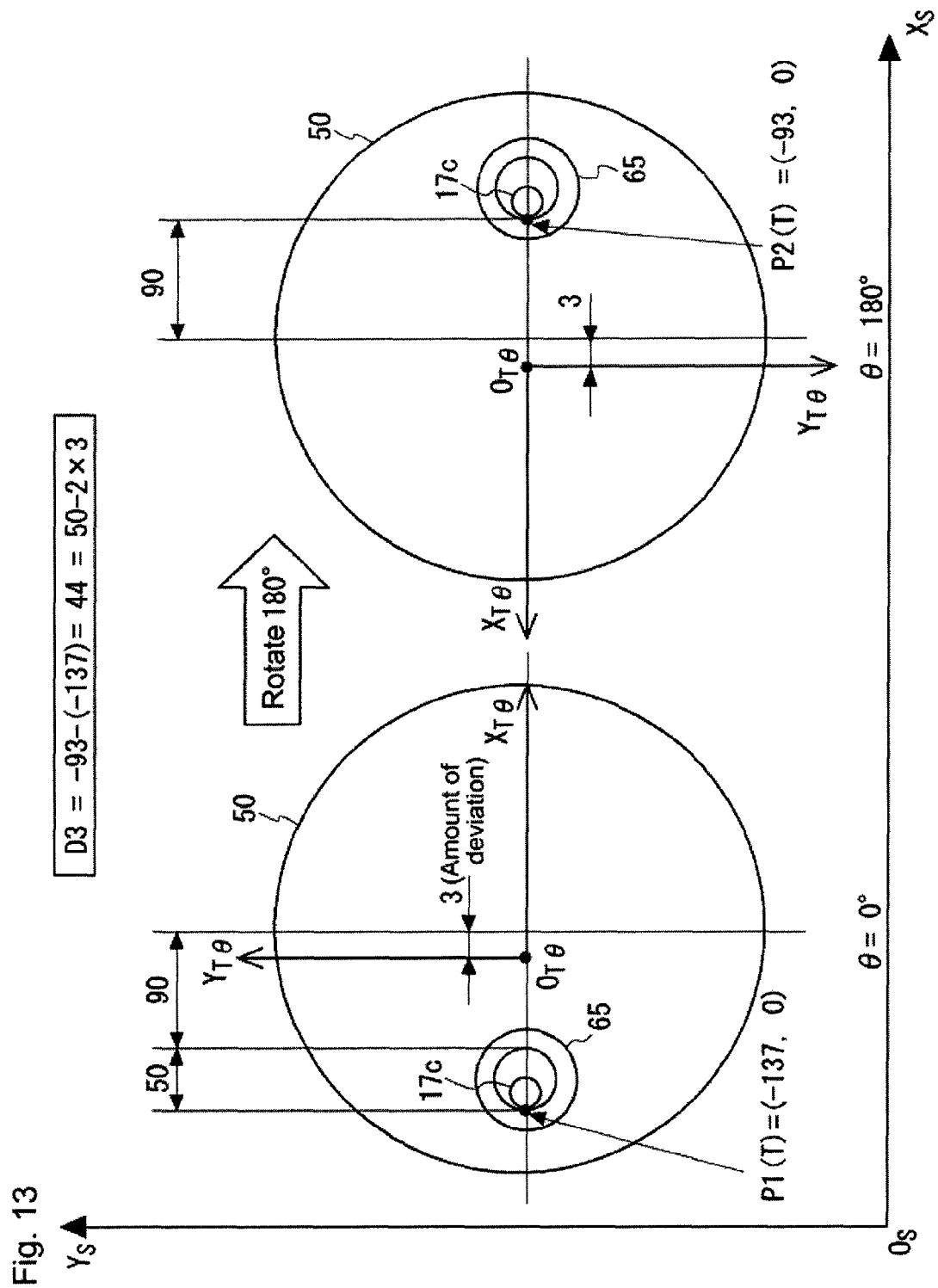
FIG. 13 is a schematic view describing principles of the correction process for the center coordinate of the rotary table coordinate system.

With reference to FIG. 11, a rotary table rotating coordinate system coordinate P3(T) for a point of contact P3 between the tip 17c and the ring gauge 65 is represented by the following formula, the tip 17c and the ring gauge 65 making contact when the probe 17 approaches in the $Y_T$ axis direction in a state where the rotation angle θ is 0°.

[Formula 12]
$$P3(T) = (-L6 - Xt, L4 + L5 - Yt) \quad (12)$$

Here, L4 is a distance from a straight line to the inner diameter end of the ring gauge 65, the straight line passing through the true center of rotation of the rotary table 50 and running parallel to the $X_{T\theta}$ axis. L5 is equal to the calibrated diameter value Dc of the ring gauge 65. L6 is a distance from a straight line to the point of contact P3, the straight line passing through the true center of rotation of the rotary table 50 and running parallel to the $Y_{T\theta}$ axis.

Similarly, a rotary table rotating coordinate system coordinate P4(T) for a point of contact P4 between the tip 17c and the ring gauge 65 is represented by the following formula, the tip 17c and the ring gauge 65 making contact when the rotation angle θ is 180°.

[Formula 13]
$$P4(T) = (-L6 + Xt, L4 + Yt) \quad (13)$$

A distance between the coordinates P3(T) and P4(T) is equal to the diameter value D4 measured in step S14, and thus yields the following formula.

[Formula 14]

$$(2Xt)^2+(Dc+2Yt^2)=D4^2 \quad (14)$$

When Formula 11 and Formula 14 are expanded so as to be solved simultaneously, the following formulae are obtained.

[Formula 15]

$$Dc^2+4DcXt+4Xt^2+4Yt^2=D3^2 \quad (15)$$

[Formula 16]

$$Dc^2+4DcYt+4Xt^2+4Yt^2=D4^2 \quad (16)$$

When solving for Yt by subtracting Formula 15 from Formula 16, Yt is represented by the following formula.

[Formula 17]

$$Yt = Xt + \frac{D4^2 - D3^2}{4Dc} = Xt + M2 \quad (17)$$

When Formula 17 is substituted into Formula 15 and simplified, the following formula is obtained.

[Formula 18]

$$8Xt^2+(4Dc+8M2)Xt+Dc^2-D3^2+4M2^2 0 \quad (18)$$

When Formula 18 is solved and simplified, the solution having the smaller absolute value is represented by the following formula.

[Formula 19]

$$Xt = \frac{-(Dc + 2M2) + \sqrt{2D3^2 - Dc^2 + 4DcM2 - 4M2^2}}{4} \quad (19)$$

Xt is found using Formula 19, and Yt is found using Formula 17.

A basic test of the validity of Formula 19 can be performed as noted hereafter. Where D4=D3, M2=0 and, from Formula 17, Yt=Xt. This corresponds to deviation in the diameter values exhibiting no directionality, and therefore satisfies a basic condition. When D4=D3, Formula 19 is represented by the following formula.

[Formula 20]

$$Xt = \frac{-Dc + \sqrt{2D3^2 - Dc^2}}{4} \quad (20)$$

In Formula 20, when D3=Dc, Xt=0. Then, because Yt=Xt, Yt=0. This indicates that when deviation does not occur in the diameter values, the true center of rotation of the rotary table 50 matches the origin point $O_T$ ($O_{T\theta}$), and illustrates the validity of Formula 19.

In addition, in a case where D3≠Dc in Formula 20, when D3>Dc, Xt>0 and when D3<Dc, Xt<0. Xt being >0 when D3>Dc is consistent with D3 being >Dc in a case shown in FIG. 12 using exemplary numeric values (Xt=3, Yt=0, L1=90, L2=Dc=50, and L3±0). Xt being <0 when D3<Dc is consistent with D3 being <Dc in a case shown in FIG. 13 using exemplary numeric values (Xt=−3, Yt=0, L1=90, L2=Dc=50, and L3=0). These illustrate the validity of Formula 19. Given the above, Xt and Yt are calculated using Formula 17 and Formula 19.

According to the present embodiment, coordinates for the rotary table coordinate system origin point $O_T$ ($O_{T\theta}$) are corrected based on the calibrated diameter value Dc of the ring gauge 65; the diameter value D1 or D3 of the ring gauge 65, measured by the probe approaching the ring gauge 65 in the −$X_T$ axis direction; and the diameter value D2 or D4 of the ring gauge 65 measured by the probe approaching the ring gauge 65 in the $Y_T$ axis direction. Accordingly, a degree of accuracy of a registered value for the rotary table coordinate system origin point can be increased.

Moreover, the approach direction in one or both of steps S12 and S14 may be the $X_T$ axis direction. Specifically, the approach direction in steps S12 and S14 is a direction parallel to the Xs axis, as viewed in the Zs axis direction. In addition, the approach direction in one or both of steps S13 and S15 may be the −$Y_T$ axis direction. Specifically, the approach direction in steps S13 and S15 is a direction parallel to the Ys axis, as viewed in the Zs axis direction. Moreover, in a case where the Zs axis and the $Z_T$ axis ($Z_{T\theta}$ axis) are parallel and the $X_T$ axis, the $Y_T$ axis, and the $Z_T$ axis are mutually orthogonal, the approach direction in steps S12 and S14 is a direction parallel to the Xs axis, while the approach direction in steps S13 and S15 is a direction parallel to the Ys axis.

Furthermore, there is a possibility that the center of the rotary table 50 may differ between a time when the clamp 51 is clamping the rotary table 50 and a time when the clamp 51 is not clamping the rotary table 50. According to the present embodiment, the corrected coordinates (Xc1, Yc1, Zc) calculated based on the static point measurement of steps S12 and S13 are registered as the coordinates of the rotary table coordinate system origin point to be used in "clamp on" measurement, while the corrected coordinates (Xc2, Yc2, Zc) calculated based on the rotary table scanning measurement of steps S14 and S15 are registered as the coordinates of the rotary table coordinate system origin point to be used in "clamp off" measurement. By differentiating the coordinates of the rotary table coordinate system origin point between the "clamp on" measurement and the "clamp off" measurement in this way, the degree of accuracy of a measurement using the rotary table 50 can be improved. Moreover, in a case where the center of the rotary table 50 matches up both when the clamp 51 is clamping the rotary table 50 and when the clamp 51 is not clamping the rotary table 50, one of the static point measurement of steps S12 and S13 and the rotary table scanning measurement of steps S14 and S15 need not be performed.

According to the present embodiment, the $Z_T$ axis ($Z_T\theta$ axis) is determined using the two master balls 61 and 62, which are each a different distance from the rotary table 50. Therefore, an error due to run-out of the rotation axis of the rotary table 50 can be inhibited.

Moreover, the present invention is not limited to the embodiment described above, and may be modified as needed without departing from the scope of the present invention. For example, a round cylindrical carpenter's square or a standard ball (including a master ball) may be used instead of the ring gauge 65. Furthermore, the $Z_T$ axis of the rotary table coordinate system may be found without using the master ball 62. In such a case, a normal line N1 (see FIG. 4) of a plane where the circle C1 is formed, the normal line N1 passing through the center of the circle C1, is defined as the $Z_T$ axis.

Furthermore, the approach direction of the probe 17 in steps S12 and S14 and the approach direction of the probe 17 in steps S13 and S15 need not be parallel to the $X_T$ axis and the $Y_T$ axis, respectively (i.e., parallel to the $X_{T\theta}$ axis and the $Y_{T\theta}$ axis, respectively, where θ=0°). When the approach direction in steps S12 and S14 and the approach direction in steps 13 and 15 are parallel to the $X_{T\theta}$ axis and the $Y_{T\theta}$ axis, respectively, where θ=β, (Xt1,Yt1) and (Xt2,Yt2) calculated in step S16 represent deviation between a true center of rotation of the rotary table 50 and the origin point $O_T$ calculated in step S10, the deviation being parallel to the $X_{T\theta}$ axis and the $Y_{T\theta}$ axis, respectively, where θ=β. When a rotation matrix corresponding to β is used, deviation parallel to the $X_{T\theta}$ axis and the $Y_{T\theta}$ axis, respectively, where θ=β can be converted into deviation parallel to the $X_{T\theta}$ axis and the $Y_{T\theta}$ axis, respectively, where θ=0°. Based on the post-conversion deviation and Formulas 7 and 8, true coordinate values Xc1, Xc2, Yc1, and Yc2 can be calculated for the origin point $O_T$.

In the above-noted example, the program can be stored using various types of non-transitory computer-readable media and can be supplied to a computer. Non-transitory computer-readable media include various types of tangible storage media. Examples of non-transitory computer-readable media include a magnetic storage medium (for example, a flexible disk, magnetic tape, and a hard disk drive); a magnetooptical storage medium (for example, a magnetooptical disk); a CD-ROM (Read Only Memory); a CD-R; a CD-R/W; and a semiconductor memory (for example, a mask ROM, PROM (Programmable ROM), EPROM (Erasable PROM), flash ROM, and RAM (Random Access Memory)). In addition, the program may be supplied to the computer by various types of transitory computer readable media. Examples of transitory computer readable media include an electric signal, an optical signal, and an electromagnetic wave. Transitory computer readable media can supply the program to the computer via a wired communication channel such as electric wires and optical fibers, or via a wireless communication channel.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A form measuring apparatus comprising:
   a probe configured to measure a measured object;
   a rotary table on which the measured object is to be placed and which is rotatable relative to the probe; and
   a coordinate system calculator configured to:
     calculate coordinate axes to establish a coordinate system for the rotary table;
     calculate, based on a position of a master ball fixated to the rotary table, a center of a circle traced by the master ball when the rotary table is rotated;
     calculate a coordinate system of the rotary table having the center of the circle as an origin point; and
     correct coordinates of the origin point based on a calibrated diameter value of a gauge fixated to the rotary table, a first diameter value of the gauge measured by a first measurement in which the probe approaches the gauge in a first direction, and a second diameter value of the gauge measured by a second measurement in which the probe approaches the gauge in a second direction.

2. The form measuring apparatus according to claim 1, wherein:
   the probe is drivable so as to run parallel to each of an Xs axis, a Ys axis, and a Zs axis, which are mutually orthogonal,
   a rotation axis of the rotary table is parallel to the Zs axis,
   the first direction is parallel to the Xs axis, as viewed in the Zs axis direction, and
   the second direction is parallel to the Ys axis, as viewed in the Zs axis direction.

3. The form measuring apparatus according to claim 2, further comprising a coordinate system register configured to register the coordinate system of the rotary table, wherein:
   the first measurement is a static point measurement, in which the probe approaches the gauge in the first direction in a case where the rotary table has a plurality of different rotation angles,
   the second measurement is a static point measurement, in which the probe approaches the gauge in the second direction in a case where the rotary table has a plurality of different rotation angles,
   the coordinate system calculator is further configured to calculate first corrected coordinates by correcting the coordinates of the origin point based on the calibrated diameter value, the first diameter value, and the second diameter value, and also calculates second corrected coordinates by correcting the coordinates of the origin point based on the calibrated diameter value, a third diameter value of the gauge measured by rotary table scanning measurement in which the probe approaches the gauge in a third direction parallel to the first direction, and a fourth diameter value of the gauge measured by rotary table scanning measurement in which the probe approaches the gauge in a fourth direction parallel to the second direction, and
   the coordinate system register is further configured to register the first corrected coordinates as the coordinates of the origin point in the coordinate system of the rotary table to be used in clamp-on measurement, which measures a work piece fixated to the rotary table in a state where the rotary table is clamped so as to not rotate, and also registers the second corrected coordinates as the coordinates of the origin point in the coordinate system of the rotary table to be used in clamp-off measurement, which measures the work piece fixated to the rotary table in a state where the rotary table is not clamped.

4. The form measuring apparatus according to claim 3, wherein:
   the coordinate system of the rotary table includes a $Z_T$ axis corresponding to the rotation axis of the rotary table, the coordinate system calculator is further configured to:
calculate, based on a position of a second master ball fixated to the rotary table, the center of a second circle traced by the second master ball when the rotary table is rotated, and
calculate the $Z_T$ axis based on the centers of the first and second circles, and
a distance from the rotary table to the first master ball is different from the distance from the rotary table to the second master ball.

5. The form measuring apparatus according to claim 2, wherein:
the coordinate system of the rotary table includes a $Z_T$ axis corresponding to the rotation axis of the rotary table,
the coordinate system calculator is further configured to:
calculate, based on a position of a second master ball fixated to the rotary table, the center of a second circle traced by the second master ball when the rotary table is rotated, and
calculate the $Z_T$ axis based on the centers of the first and second circles, and
a distance from the rotary table to the first master ball is different from the distance from the rotary table to the second master ball.

6. The form measuring apparatus according to claim 1, further comprising a coordinate system register configured to register the coordinate system of the rotary table, wherein:
the first measurement is a static point measurement, in which the probe approaches the gauge in the first direction in a case where the rotary table has a plurality of different rotation angles,
the second measurement is a static point measurement, in which the probe approaches the gauge in the second direction in a case where the rotary table has a plurality of different rotation angles,
the coordinate system calculator is further configured to calculate first corrected coordinates by correcting the coordinates of the origin point based on the calibrated diameter value, the first diameter value, and the second diameter value, and also calculates second corrected coordinates by correcting the coordinates of the origin point based on the calibrated diameter value, a third diameter value of the gauge measured by rotary table scanning measurement in which the probe approaches the gauge in a third direction parallel to the first direction, and a fourth diameter value of the gauge measured by rotary table scanning measurement in which the probe approaches the gauge in a fourth direction parallel to the second direction, and
the coordinate system register is further configured to register the first corrected coordinates as the coordinates of the origin point in the coordinate system of the rotary table to be used in clamp-on measurement, which measures a work piece fixated to the rotary table in a state where the rotary table is clamped so as to not rotate, and also registers the second corrected coordinates as the coordinates of the origin point in the coordinate system of the rotary table to be used in clamp-off measurement, which measures the work piece fixated to the rotary table in a state where the rotary table is not clamped.

7. The form measuring apparatus according to claim 6, wherein:
the coordinate system of the rotary table includes a $Z_T$ axis corresponding to the rotation axis of the rotary table,
the coordinate system calculator is further configured to:
calculate, based on a position of a second master ball fixated to the rotary table, the center of a second circle traced by the second master ball when the rotary table is rotated, and
calculate the $Z_T$ axis based on the centers of the first and second circles, and
a distance from the rotary table to the first master ball is different from the distance from the rotary table to the second master ball.

8. The form measuring apparatus according to claim 1, wherein:
the coordinate system of the rotary table includes a $Z_T$ axis corresponding to the rotation axis of the rotary table,
the coordinate system calculator is further configured to:
calculate, based on a position of a second master ball fixated to the rotary table, the center of a second circle traced by the second master ball when the rotary table is rotated, and
calculate the $Z_T$ axis based on the centers of the first and second circles, and
a distance from the rotary table to the first master ball is different from the distance from the rotary table to the second master ball.

9. A method of registering a rotary table coordinate system, the method comprising:
measuring a position of a master ball fixated to a rotary table using a coordinate measuring machine in a case where the rotary table has a plurality of different rotation angles;
calculating, based on the position of the master ball, a center of a circle traced by the master ball when the rotary table is rotated;
calculating a coordinate system of the rotary table having the center of the circle as an origin point;
measuring a first diameter value of a gauge fixated to the rotary table using a first measurement, in which a probe of the coordinate measuring machine approaches the gauge in a first direction;
measuring a second diameter value of the gauge using a second measurement, in which the probe approaches the gauge in a second direction; and
correcting coordinates of the origin point based on each of a calibrated diameter value, the first diameter value, and the second diameter value of the gauge.

* * * * *